United States Patent
Chu et al.

(10) Patent No.: US 6,374,641 B1
(45) Date of Patent: Apr. 23, 2002

(54) METHOD OF MAKING AN OPTICAL FIBER BY MELTING PARTICULATE GLASS IN A GLASS CLADDING TUBE

(75) Inventors: Polly Wanda Chu, Painted Post; Matthew John Dejneka, Corning; Brian Paul Tyndell, Addison; Kevin Joseph Yost, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/590,231

(22) Filed: Jun. 8, 2000

Related U.S. Application Data (62) Division of application No. 09/103,655, filed on Jun. 23, 1998, now Pat. No. 6,128,430.
(60) Provisional application No. 60/050,469, filed on Jun. 23, 1997.

(51) Int. Cl.[7] .............................................. C03B 37/025
(52) U.S. Cl. .............................. 65/385; 65/404; 65/390; 65/427
(58) Field of Search .......................... 65/390, 404, 427, 65/385

(56) References Cited

U.S. PATENT DOCUMENTS

| | | | |
|---|---|---|---|
| 4,163,654 A | * 8/1979 | Krohn | 65/404 |
| 4,277,270 A | * 7/1981 | Krohn | 65/404 |
| 4,936,650 A | 6/1990 | Ainslie et al. | |
| 4,962,995 A | 10/1990 | Andrews et al. | |
| 5,253,322 A | 10/1993 | Onishi et al. | |
| 5,573,571 A | 11/1996 | Kopylov et al. | |
| 5,747,397 A | 5/1998 | McPherson et al. | |
| 6,128,430 A | * 10/2000 | Chu | 65/427 |

FOREIGN PATENT DOCUMENTS

| JP | 55-46979 | * 11/1980 | 65/404 |
|---|---|---|---|

OTHER PUBLICATIONS

Semenkoff et al., "Improvement of gain flatness of optical fluoride fiber amplifiers for multiwavelength transmission", Journal of Non–Crystalline Solids, 184 (1995), pp. 240–243.
Bayart et al., "1.55 βm fluoride–based EDFA with gain–flatness control for multiwavelength applications", Electronics Letters, 18th Aug. 1994, vol. 30, No. 17, pp. 1407–1409.

* cited by examiner

*Primary Examiner*—John Hoffmann (57) ABSTRACT

An optical article having a rare earth doped, fluorinated aluminosilicate glass core composition consisting essentially, in mole %, of:

| | |
|---|---|
| $SiO_2$ | 0–90 |
| $GeO_2$ | 0–90 |
| $Na_2O$ | 0–25 |
| $Li_2O$ | 0–10 |
| $K_2O$ | 0–25 |
| $Rb_2O$ | 0–25 |
| $Cs_2O$ | 0–25 |
| $Al_2O_3$ | 5–40 |
| $Ga_2O_3$ | 5–40 |
| $RE_2(1)O_3$ | 0–40 |
| $RE_2(2)O_3$ | 0–1 |
| $Er_2O_3$ | 0.001–5 |
| $Yb_2O_3$ | 0–5 |
| $PbO$ | 0–15 |
| $RO$ | 0–20 |
| $ZnO$ | 0–10 |
| $ZrO_2$ | 0–2 |
| $TiO_2$ | 0–2 |
| $Nb_2O_5$ | 0–10 |
| $Ta_2O_5$ | 0–10 |
| $P_2O_5$ | 0–5 |
| $B_2O_3$ | 0–15 |
| $As_2O_3$ | 0–10 |
| $Sb_2O_3$ | 0–20 |
| $Na_2Cl_2$ | 0–10 |
| $Bi_2O_3$ | 0–5, and | up to 15 weight % fluorine in the form of at least one of a fluorinated component of the glass composition and a batch constituent selected from a group consisting of at least one of $AlF_3$, $REF_3$, $NH_5F_2$, $NaF$, $Na_2SiF_6$, $Na_3AlF_6$, where RE(1) is at least one of Y, La, Gd, and Lu;

RE(2) is at least one of Ce, Pr, Nd, Sm, Eu, Tb, Dy, Ho, and Tm;

R is at least one of Ba, Ca, Mg, and Sr;

$(SiO_2+GeO_2)$ is in the range (40–90); and $(Al_2O_3+Ga_2O_3)>(RO+"alk"_2O+RE_2O_3)$ where "alk" is at least one of Li, Na, K, Cs, and Rb. A cullet-in-tube method for making continuous clad filament is also described.

The invention provides for an optical waveguiding article having relatively high gain, a relatively flat gain spectrum, compatibility with conventional silica fiber, good durability and ease of manufacture.

6 Claims, 4 Drawing Sheets

METHOD OF MAKING AN OPTICAL FIBER BY MELTING PARTICULATE GLASS IN A GLASS CLADDING TUBE

This is a division of application Ser. No. 09/103,655, filed Jun. 23, 1998 U.S. Pat. No. 6,128,430, which claims the benefit of and priority to U.S. Application Serial No. 60/050,469, filed Jun. 23, 1997.

BACKGROUND OF THE INVENTION

1. Field of the Invention

This invention relates to a novel core glass composition that is particularly suited for, but not limited to, optical waveguiding signal amplifier articles due, in part, to the flatness of its gain spectrum; and to a non-CVD method for making continuous clad filaments. More particularly, the invention relates to a novel rare earth doped, fluorinated aluminosilicate glass composition and to a cullet-in-tube method for making continuous clad filament such as, e.g., optical waveguiding fiber and conductive conduit.

2. Description of Related Art

This application is related to provisional U.S. application serial No. 60/034472, filed on Jan. 2, 1997, which is herein incorporated by reference in its entirety.

Erbium doped optical amplifiers and, in particular, erbium doped fiber amplifiers, have revolutionized optical telecommunications by providing all optical high gain, low noise amplification without the need for costly repeaters. Current erbium doped fiber amplifiers, however, are not well suited for multi-channel amplification due to the variation of their gain spectrum as a function of wavelength, denoting gain flatness or the lack thereof. As used herein, the term "gain flatness" will refer to the change in the shape of the gain spectrum over a particular wavelength range; i.e., flat gain means substantially equal gain for all wavelengths over the wavelength range of interest. For erbium, the wavelength range of interest is from about 1530 nm to 1560 nm. When the gain spectrum is not sufficiently flat over this wavelength interval, multiple channels at different wavelengths are not uniformly amplified, making high data rate communication systems inoperable, impractical and unaffordable.

The art teaches that co-doping an erbium doped fiber with $Al_2O_3$ increases Er solubility and results in a flatter gain spectrum than that exhibited by an erbium doped pure silica fiber. However, currently known erbium doped aluminosilicate compositions yield a best performance gain flatness of about 27 dB of gain deviation per 100 dB of gain over a 32 nm wide band, and are prone to devitrification at high levels, i.e., greater than a few weight percent of $Al_2O_3$. Compositions of $SiO_2$ doped with $La_2O_3$ or $La_2O_3+Al_2O_3$ have also shown improved gain flatness and rare earth solubility, but the $Al_2O_3$ and $La_2O_3$ concentrations are all well below 1%, and thus have but a minor effect.

Fluoride glasses, e.g., ZBLAN ($57ZrF_4$-$20BaF_2$-$4LaF_3$-$3AlF_3$-$20NaF$ (mole %)) exhibit good gain flatness and low phonon energy, but these compositions require pumping at 1480 nm due to up-conversion effects, and exhibit increased noise over 980 nm pumping. Moreover, they are difficult to fiberize, are not fusion spliceable to silica fibers, are prone to devitrification, and have poor durability.

In addition to gain flatness, the gain provided by a rare earth doped host medium is also a parameter of interest. Higher gains can theoretically be achieved by increasing the concentration of the suitable rare earth dopant; however, above a modest concentration, rare earth ion clustering and concentration quenching become a problem. Current CVD methods for glass fiber preform fabrication are quite limited by the composition ranges of the host glasses. Only modest amounts of rare earth elements can be incorporated without clustering effects, and volatile components such as alkalis and halogens cannot be introduced because of their tendency to vaporize during laydown. Furthermore, other important glass modifiers, e.g., alkaline earths, cannot be incorporated due to lack of high vapor pressure CVD precursors. Even if a glass soot can be deposited by CVD, it must subsequently be consolidated which can lead to crystallization or loss of glass components with high vapor pressures.

The inventors have therefore recognized a need for a glass composition and optical waveguide articles made therefrom that accommodate high levels of rare earth doping without clustering to provide high gain; that provide an improvement in gain flatness over conventional compositions; that are pumpable at 980 nm for good noise performance; that are fusion spliceable to conventional silica based fibers; that match or exceed the durability of conventional optical fiber waveguides; and that are easy to fabricate. Related application serial No. 60/034472 describes a novel glass-ceramic composition and devices made therefrom that exhibits many of the advantageous requirements described above. The inventors have discovered, however, that the composition of the instant invention provides those advantages while eliminating the additional ceraming step required to make the glass-ceramic, and further provides a wider constituent composition range.

Accordingly, there is a need for a method for making waveguiding optical fiber from a wide variety of glass and glass-ceramic compositions, and other continuous clad filament articles such as, e.g., conductive conduit, that overcomes the disadvantages of the known methods, and that is more practical, efficient, and economical than conventional methods. The "cullet-in-tube" method of the invention allows almost any glass that can be produced by chemical (sol-gel, vapor deposition, etc.) or physical (batch and melt) techniques, or other feedstock in granular or powder form ("cullet" as referred to herein), to be economically fabricated in the form of a continuous clad filament. The rapid quenching of this technique allows for unstable glasses and glass-ceramics to be fiberized.

SUMMARY OF THE INVENTION

To achieve these and other advantages and in accordance with the purpose of the invention, as embodied and broadly described, an embodiment of the invention is directed to an optical waveguiding device including a rare earth doped, fluorinated aluminosilicate glass core composition.

In an embodiment of the invention, the core composition consists essentially, in mole %, of:

| | |
|---|---|
| $SiO_2$ | 0–90 |
| $GeO_2$ | 0–90 |
| $Na_2O$ | 0–25 |
| $Li_2O$ | 0–10 |
| $K_2O$ | 0–25 |
| $Rb_2O$ | 0–25 |
| $Cs_2O$ | 0–25 |
| $Al_2O_3$ | 0–40 |
| $Ga_2O_3$ | 0–40 |
| $RE_2(1)O_3$ | 0–40 |
| $RE_2(2)O_3$ | 0–1 |
| $Er_2O_3$ | 0.001–5 |

-continued

| | |
|---|---|
| $Yb_2O_3$ | 0–5 |
| PbO | 0–15 |
| RO | 0–20 |
| ZnO | 0–10 |
| $ZrO_2$ | 0–2 |
| $TiO_2$ | 0–2 |
| $Nb_2O_5$ | 0–10 |
| $Ta_2O_5$ | 0–10 |
| $P_2O_5$ | 0–5 |
| $B_2O_3$ | 0–15 |
| $As_2O_3$ | 0–10 |
| $Sb_2O_3$ | 0–20 |
| $Bi_2O_3$ | 0–5 |
| $Na_2Cl_2$ | 0–10, and | up to 15 weight % fluorine in the form of a fluorinated component of the glass composition,
where RE(1) is $Y^{3+}$ and/or $La^{3+}$ and/or $Gd^{3+}$ and/or $Lu^{3+}$; RE(2) is $Ce^{3+}$ and/or $Pr^{3+}$ and/or $Nd^{3+}$ and/or $Sm^{3+}$ and/or $Eu^{3-}$ and/or $Tb^{3-}$ and/or $Dy^{3+}$ and/or $Ho^{3+}$ and/or $Tm^{3+}$; R is Ba and/or Ca and/or Mg and/or Sr; ($SiO_2$–$GeO_2$) is between 40–90% mole; and the amount of ($Al_2O_3$+$Ga_2O_3$) >(RO+"alk"$_2$O+$RE_2O_3$), where "alk" is Li and/or Na and/or K and/or Rb and/or Cs.

In an embodiment of the invention, the fluorine can be batched as one or more of the following: $AlF_3$, $REF_3$, $NH_5F_2$, NaF, $Na_2SiF_6$, $Na_3AlF_6$.

In another embodiment of the invention, the optical waveguiding device has a core region consisting essentially of the composition described above and a cladding region of silicate glass adjacent the core. In an aspect of this embodiment, the cladding composition consists essentially, in mole %, of:

| | |
|---|---|
| $SiO_2$ | 90–100 |
| $B_2O_3$ | 0–10 |
| $P_2O_5$ | 0–10 |
| $Al_2O_3$ | 0–10 |
| $GeO_2$ | 0–10, and |
| $SiF_4$ | 0–10. |

In related aspects of this embodiment, the waveguiding device is a low loss, single mode or multimode optical fiber waveguide.

In another aspect of this embodiment, the waveguiding device is a rare earth doped optical fiber component of a fiber optical amplifier which exhibits a gain flatness of less than 17 dB gain variation per 100 dB gain over a 32 nm band when pumped by an appropriate excitation source, and preferably a gain variation between about 2–16 dB/100 dB gain over selected wavelength bands between about 1525–1565 nm.

In a further embodiment, the invention is directed to a non-CVD, "cullet-in-tube" method for making a continuous clad filament, that involves filling a cladding tube that is chemically compatible with a core composition, with a core feedstock consisting of cullet of the desired, finished core composition having a particle size of between about 100–5,000 μm, in which the cladding tube composition is more refractory than the core composition (i.e., having a softening point that is greater than the melting point of the core composition), heating an end of the tube to near its softening temperature in a furnace whereby the core composition within the tube is melted, and elongating the tube so as to draw filament therefrom. Preferably, the feedstock will have the core composition described above and a silicate cladding composition. In an aspect of this embodiment, the feedstock will be cullet of conductive conduit, e.g., a superconducting composition. Cladding compositions may include, e.g., silica, calcium aluminate glass, Pyrex®.

It will be appreciated by those skilled in the art that the cullet-in-tube method embodiment disclosed herein provides for making axially graded or axially-hybrid core filaments by introducing core cullet of selected compositions into the cladding tube. This process allows for the manufacture of a continuous clad filament having axially varying parameters of interest (e.g., refractive index). Such a product could take the non-limited form of, e.g., a hybrid doped active fiber for fiber amplifier applications.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

It is to be understood that both the foregoing general description and the following detailed description are exemplary and are intended to provide further explanation of the invention as claimed. The accompanying drawings are included to provide a further understanding of the invention and are incorporated in, and constitute a part of, this specification; illustrate embodiments of the invention; and together with the description serve to explain the principles of the invention.

DETAILED DESCRIPTION OF A PREFERRED EMBODIMENT OF THE INVENTION

A preferred embodiment of the invention is directed to an optical waveguiding device having a new rare earth doped, fluorinated aluminosilicate glass core composition, and to a non-CVD method for making a waveguiding optical fiber having the inventive core composition and a silicate glass cladding.

Reference will now be made in detail to the present preferred embodiments of the invention, examples of which are illustrated in the accompanying drawings and tables presented herein.

In a preferred embodiment of the invention, an optical article has a glass composition consisting essentially, in mole %, of:

| | |
|---|---|
| SiO$_2$ | 60–85 |
| GeO$_2$ | 0–5 |
| Na$_2$O | 3–15 |
| Li$_2$O | 0–10 |
| K$_2$O | 3–15 |
| Al$_2$O$_3$ | 8–27 |
| Ga$_2$O$_3$ | 0–5 |
| RE$_2$(1)O$_3$ | 0–40 |
| Er$_2$O$_3$ | 0.002–0.1 |
| Yb$_2$O$_3$ | 0–1 |
| PbO | 0–10 |
| RO | 0–15 |
| ZnO | 0–5 |
| Ta$_2$O$_5$ | 0–2 |
| B$_2$O$_3$ | 0–2 |
| As$_2$O$_3$ | 0–2 |
| Sb$_2$O$_3$ | 0–2 |
| Na$_2$Cl$_2$ | 0–4, and | up to 15 weight % fluorine in the form of a fluorinated component of the glass composition,
where RE(1) is Y$^{3+}$ and/or La$^{3+}$ and/or Gd$^{3+}$ and/or Lu$^{3+}$; R is Ba and/or Ca and/or Mg and/or Sr; (SiO$_2$+GeO$_2$) is between 60–85 mole %; and the amount of (Al$_2$O$_3$–Ga$_2$O$_3$) >(RO+"alk"$_2$O+RE$_2$O$_3$) where "alk" is Li and/or Na and/or K and/or Rb and/or Cs In a preferred embodiment of the invention, the optical article is an optical fiber waveguiding device such as the active fiber component of a fiber optical amplifier, for example, having a core composition as described above and a silicate glass cladding. In an aspect of this embodiment, the cladding consists essentially, in mole %, of:

| | |
|---|---|
| SiO$_2$ | 90–100 |
| B$_2$O$_3$ | 0–10 |
| P$_2$O$_5$ | 0–10 |
| Al$_2$O$_3$ | 0–10 |
| GeO$_2$ | 0–10, and |
| SiF$_4$ | 0–10. |

Table I shows exemplary core glass compositions (all normalized to 100%, and all in mole % amounts), according to embodiments of the invention.

density, and liquidus temperature. As the amount of SiO$_2$ in the glass increases, the Er$^{3+}$ emission approaches that of conventional Er amplifiers and exhibits less gain flatness. As in most optical glasses, GeO$_2$ has the same role as SiO$_2$ and can be fully substituted for SiO$_2$ to increase the index of refraction.

To optimize gain flatness, the composition should contain more (Al$_2$O$_3$+Ga$_2$O$_3$) than ("alk"$_2$O+RO+RE$_2$O$_3$), otherwise an alkali silicate-like Er$^{3-}$ emission spectra will result, leading to a narrow and irregular gain spectrum. Fluorine is key to further smoothing of the gain spectrum and is also useful for drying the glass and maintaining a low refractive index for compatibility with conventional fibers. Between 2 and 50% of the batched fluorine can be lost during melting depending on composition, fluorine source, and melting time and temperature. Crucible lids, low humidity, dry batch materials, and low melting temperatures help minimize these losses. The fluorine can be batched as AlF$_3$, REF$_3$, NH$_5$F$_2$, NaF, Na$_2$SiF$_6$, Na$_3$AlF$_6$, or any other fluorinated component of the composition, up to 15 weight %.

The "alk"$_2$O and RO components increase the thermal expansion and fluorine retention, and decrease the RE solubility. Their amounts and identities can be used to tailor refractive index in the manner known to those skilled in the art. They also serve to decrease the liquidus temperature of the glass making it more stable towards devitrification. PbO increases the refractive index and decreases the liquidus. Other minor components such as ZrO$_2$, TiO$_2$, Nb$_2$O$_5$, and Ta$_2$O$_5$ can also be added to the glass to increase the refractive index.

B$_2$O$_3$ decreases the density of the glass, but it also lowers the Er$^{3+}$ fluorescence lifetime when added in significant amounts, so it is preferably used sparingly. The usual fining agents, As$_2$O$_3$ and Sb$_2$O$_3$, can be incorporated without altering the effectiveness of the material. Chloride fining agents can also be used and have the added benefit of drying the glass. The glass must be kept dry to prevent quenching of the Er$^{3+}$ via O—H phonons.

The inventive glass composition has high rare earth (RE) solubility, a high degree of gain flatness, and provides superior Er$^{3+}$ performance at 1550 nm. Gain flatness variations of less than 17 dB/100 dB of gain were achieved between 1530 to 1562 nm, with less than 4 dB of noise, in a 4.7 m fiber amplifier utilizing an active fiber waveguide

TABLE I

| e.g. | I | II | III | IV | V | VI | VII | VIII | IX | X | XI | XII |
|---|---|---|---|---|---|---|---|---|---|---|---|---|
| SiO$_2$ | 51.01 | 64.06 | 75.54 | 62.78 | 63.59 | 59.91 | 40.86 | 56.34 | 69.95 | 69.94 | 68.86 | 70.19 |
| Na$_2$O | 11.19 | 5.525 | 3.777 | 4.484 | 5.53 | 5.53 | 6.452 | 7.512 | 4.664 | 4.663 | 6.12 | 3.275 |
| Al$_2$O$_3$ | 29.08 | 21.64 | 15.11 | 21.26 | 22.12 | 22.12 | 28.41 | 20.66 | 18.65 | 18.65 | 16.07 | 18.25 |
| Al$_2$F$_6$ | 0.459 | 0.46 | 0 | 0.269 | 0 | 0 | 0.448 | 0 | 0 | 0 | 2.30 | 0 |
| La$_2$F$_6$ | 7.798 | 7.459 | 5.099 | 7.175 | 7.373 | 7.373 | 7.706 | 5.634 | 6.716 | 6.715 | 6.61 | 6.373 |
| Er$_2$F$_6$ | 0.459 | 0.46 | 0.472 | 0.448 | 0.461 | 0.461 | 0.448 | 0.469 | 0.013 | 0.026 | 0.05 | 0.047 |
| PbO | 0 | 0 | 0 | 0 | 0 | 0 | 6.72 | 0 | 0 | 0 | 0 | 0 |
| BaO | 0 | 0 | 0 | 3.587 | 0 | 0 | 0 | 0 | 0 | 0 | 0 | 0 |
| TiO$_2$ | 0 | 0 | 0 | 0 | 0.922 | 0 | 0 | 0 | 0 | 0 | 0 | 0 |
| Ta$_2$O$_5$ | 0 | 0 | 0 | 0 | 0 | 4.608 | 0 | 0 | 0 | 0 | 0 | 0 |
| B$_2$O$_3$ | 0 | 0 | 0 | 0 | 0 | 0 | 8.961 | 9.39 | 0 | 0 | 0 | 0 |
| NaCl | 0 | 0 | 0 | 0 | 0 | 0 | 0 | 0 | 0 | 0 | 0 | 1.872 |

Figure 1:
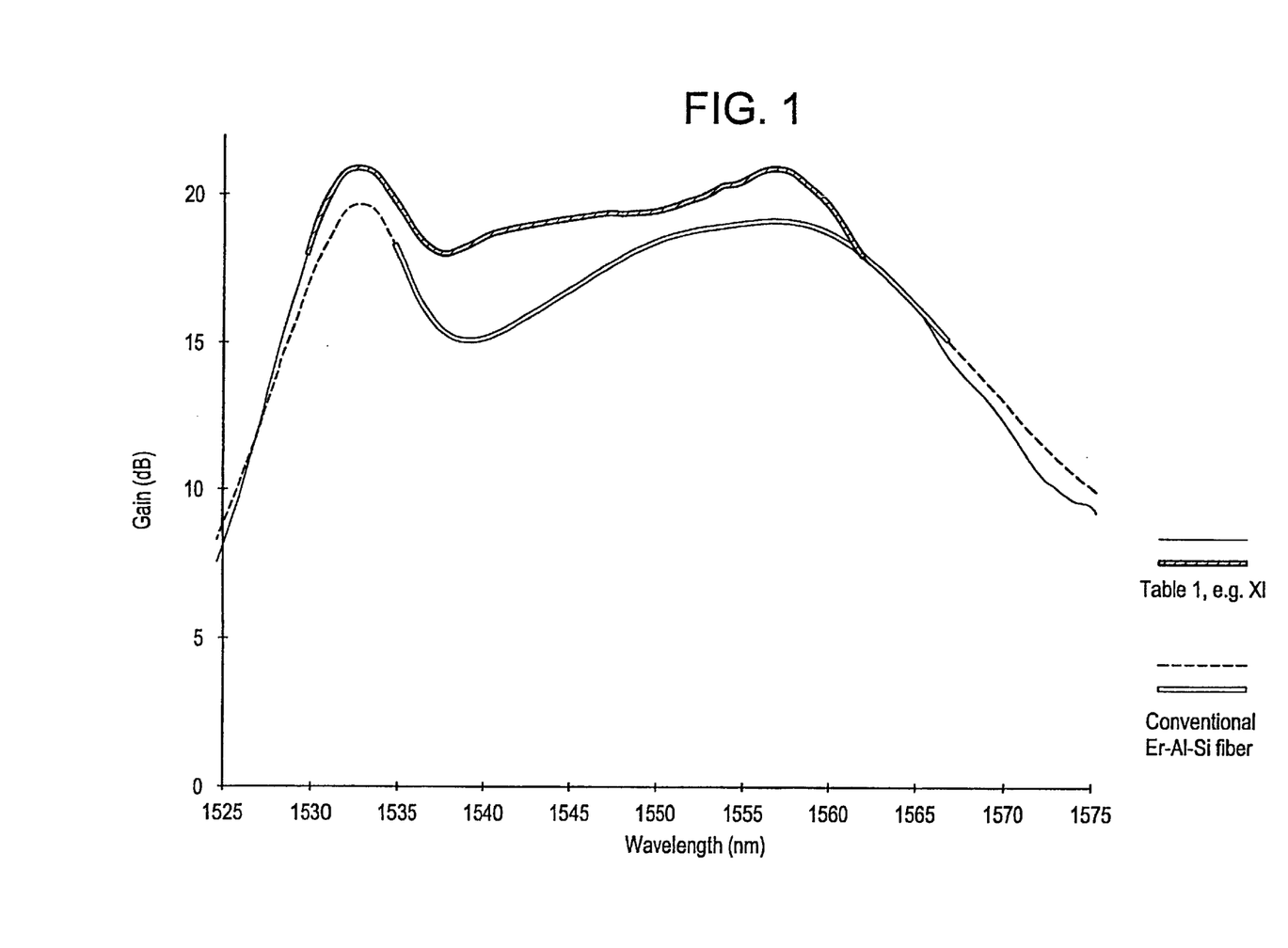
FIG. 1 shows the optimized 32 nm bandwidth gain curves for an exemplary composition embodiment of the invention (heavy line) and that of conventional alumina-doped silica (light line) with the optimized band highlighted.
Figure 2:
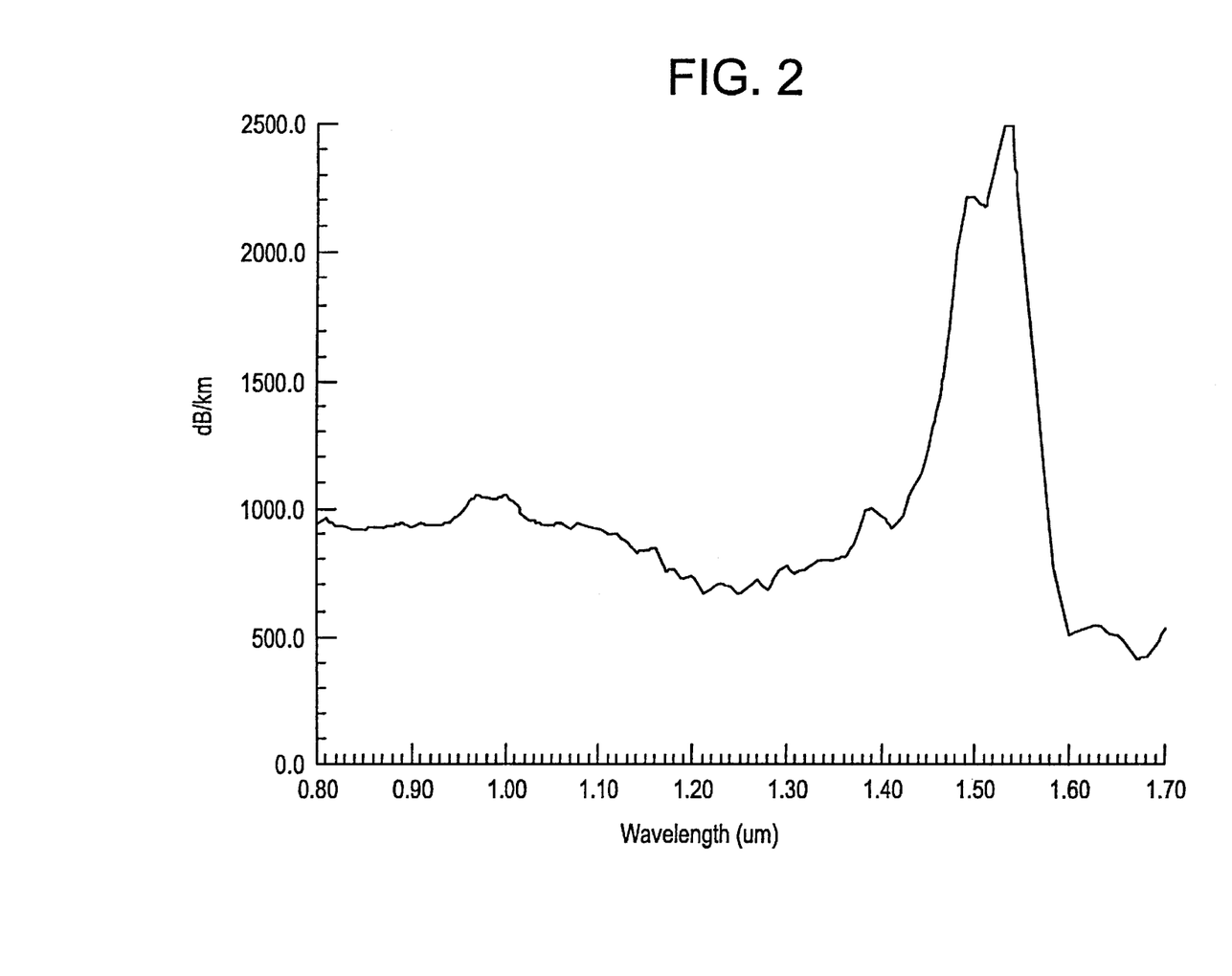
FIG. 2 is a plot of loss (attenuation) versus wavelength for a fiber waveguide according to an embodiment of the invention.
Figure 3:
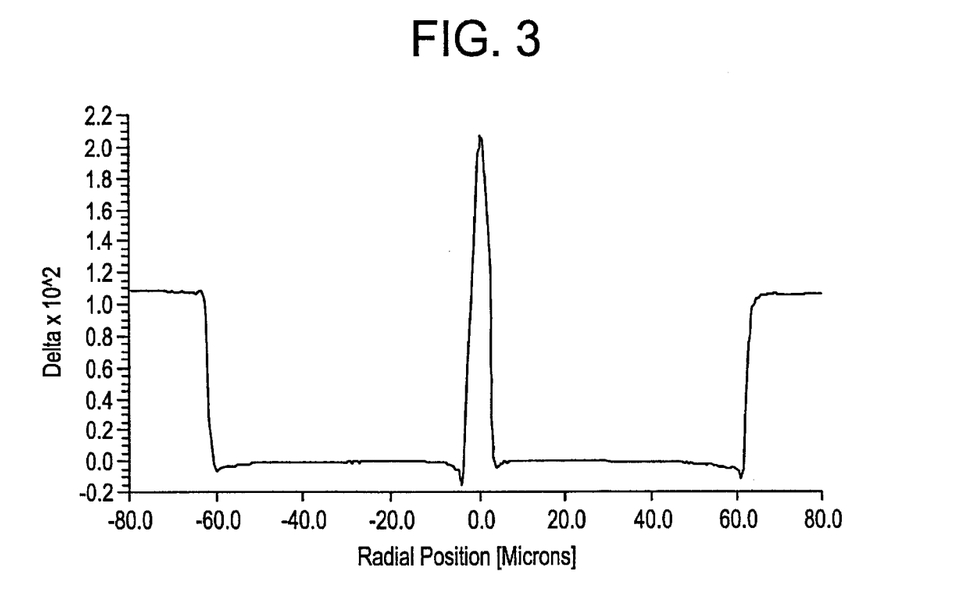
FIG. 3 shows a plot of refractive index delta versus radial distance from core center for a multimode fiber waveguide embodiment of the invention.
Figure 4:
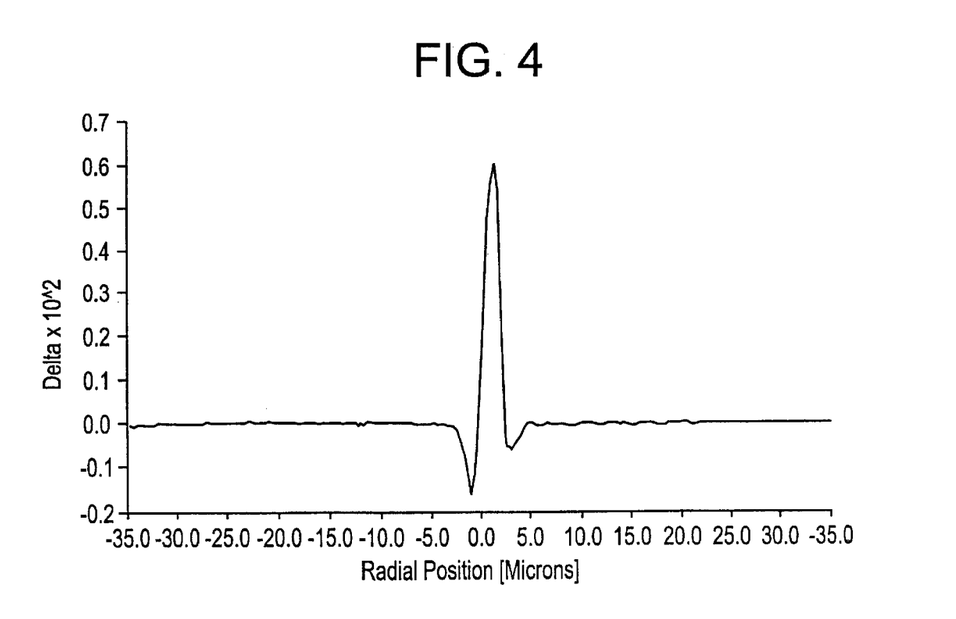
FIG. 4 shows a plot of refractive index delta versus radial position from core center for a single mode fiber waveguide embodiment of the invention.

The chemical composition of the glass can be varied over a large range to engineer both physical and optical properties as well as gain flatness for the specific application. SiO$_2$ is the main glass former, with greater SiO$_2$ levels leading to greater glass stability, viscosity, and compatibility with conventional fibers (i.e., SiO$_2$ based fibers), while decreasing the coefficient of thermal expansion, refractive index, according to an embodiment of the invention. More than 20 dB of gain was achieved with 95 mW of pump power at 980 nm. The glass modifiers are believed to be the key to obtaining the flat Er$^{3-}$ gain spectra. High levels (>1 mole %) of Al$_2$O$_3$, RE$_2$O$_3$ (RE=Y$^{3+}$, La$^{3+}$, Gd$^{3+}$, and Lu$^{3-}$), and F allegedly increase the intensity of the Er$^{3+}$ emission around 1540 nm while suppressing the emission at 1530 nm relative to the long wavelength emission (>1540 nm), thus providing a gain spectrum as shown in FIG. 1. Preferably, $Al_2O_3$ concentrations will be greater than 5 mole % and $SiO_2$ will be below 90 mole % to avoid the liquid-liquid immiscibility gap in the $SiO_2$—$Al_2O_3$—$RE_2O_3$ system. Other optional modifiers such as alkali and alkaline earth oxides will further alter the $Er^{3+}$ gain spectrum and can suppress the immiscibility Various optical articles having rare earth doped, fluorinated aluminosilicate glass cores according to embodiments of the invention have been fiberized with both borosilicate and pure silica claddings. Low loss fibers having attenuation between about 0.30–0.75 dB/m at 1310 nm, as represented in FIG. 2, have been made in multimode configurations as depicted in FIG. 3 and in single mode configurations as shown in FIG. 4. Refractive index deltas between 0.6 and 2.1% have been achieved as represented in FIGS. 3 and 4.

In an exemplary embodiment, a fiber optical amplifier comprising an active fiber according to an embodiment of the invention (Table 1, e.g. XI) was constructed. The active fiber had an $Er^{3+}$ concentration of $1.62 \times 10^{20}$ ions/cc and exhibited a gain of 18 dB over 0.18 m of fiber. The fiber amplifier had a gain flatness variation of less than 20 dB per 100 dB of gain over the 32 nm band, as shown in FIG. 1. The fiber was fusion spliced to a conventional silica based fiber and demonstrated splice losses of 0.05–0.18 dB/splice.

Although the invention has thus far been described in terms of a waveguiding optical fiber for a fiber amplifier, those skilled in the art will appreciate that the optical articles contemplated by the invention may also include, but are not limited to, e.g., planar amplifiers, fiber lasers, Faraday rotators, filters, optical isolators, and nonlinear waveguiding fibers. Moreover, in conjunction with a method embodiment of the invention to be described below, the fabrication of continuous clad filaments for conductive conduit is contemplated, resulting in, e.g., superconducting wire. Electro-optical composites are also envisaged.

A method embodiment of the invention is described for making a continuous-clad filament, preferably an optical waveguiding fiber, having an elongated core region of the novel glass composition described herein and a silicate glass cladding adjacent the core region, comprising the steps of a) providing a core feedstock in the form of finished cullet having a particle size in the range of about 100–5,000 μm; b) providing a rigid cladding structure, preferably in the form of a tube, that is chemically compatible with the core composition and is more refractory than the core composition; c) introducing the cullet into the cladding structure; d) heating an end of the core/cladding in a furnace to near the softening point of the cladding; and f) drawing the core containing cladding into a continuous clad filament. The term "finished cullet" herein refers to the ultimate or final core article composition, e.g., the novel glass according to the invention, and not to the batch or pre-melting form of the composition.

Figure 5:
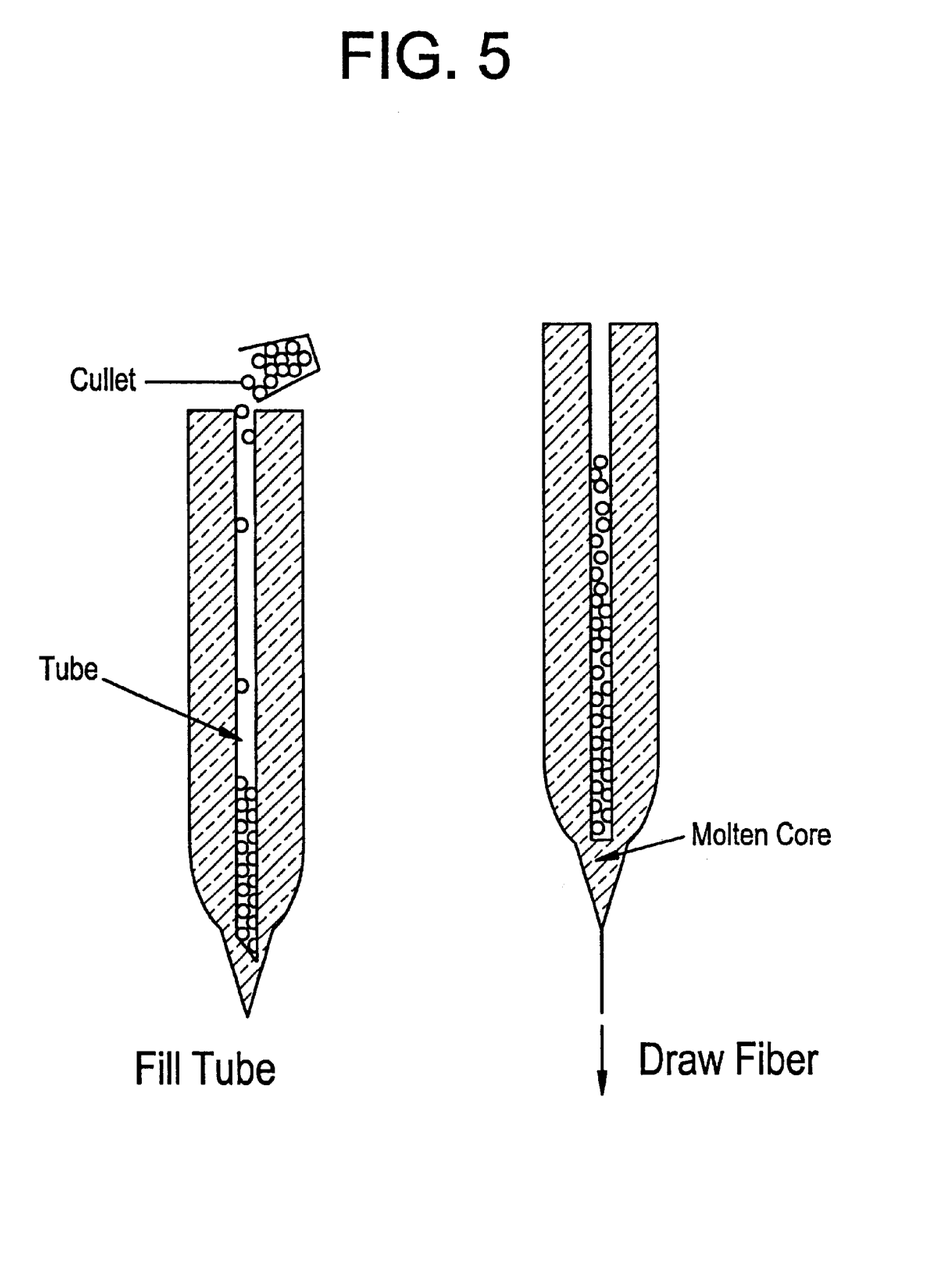
FIG. 5 is a schematic illustration of a cullet and tube fiberization method according to an embodiment of the invention.

Preferably, the core cullet is fabricated by conventional crucible melting, sol-gel, or other well known methods. As shown schematically in FIG. 5, the cullet is loaded into a hollow preform (cladding) tube. The composition of the cladding is preferably a silicate glass as described herein, but as will be appreciated by one skilled in the art, is essentially not limited and can range from pure $SiO_2$ to multicomponent glasses including, e.g., calcium aluminate glass and Pyrex®. The core cullet preferably has a melting point below the softening point of the cladding, and the thermal expansion difference between the core and the cladding is not so large as to shatter the filament. After the cladding is filled with the core cullet it can be drawn down into cladded filament or rod for overcladding. The core cullet filled cladding tube is supported in a furnace by well known means, and is heated to a sufficient temperature to soften the cladding glass for draw, and for melting and fining the core cullet. Preferably, the cladding structure is not sealed at any part thereof (this does not refer to temporarily closing off the draw end of the cladding structure if necessary) to allow for the escape of gasses or other by-products from the molten core. Preferably, the particle size of the cullet is in the range of about 100–5,000 μm to avoid impaction and allow gas or other by-products to escape.

The "cullet-in-tube" method of the invention is advantageous over conventional or known cullet-in-tube methods for a number of reasons. Since the process starts with finished glass cullet, the material is well mixed on a molecular scale, and batch reactions are complete so off-gassing and bubble formation are minimized. The glass is already fined of small seeds, and any large bubbles entrapped from the powder melting will quickly float to the top in the fluid molten core. The preferred method opens up a large range of compositions for fiberization that have not previously been attainable with CVD, MCVD or PCVD. The method also accommodates large differences in thermal expansion between the core and cladding materials since the core is not rigidly bonded to the clad until it is in fiber form when the stresses due to thermal expansion mismatch are much smaller than in a rigid monolithic preform. The porous cullet also allows for atmospheric control of the melt at the drawing temperature. The pressure above the core can be controlled to regulate the core diameter, as can the draw temperature. Higher draw temperatures will lead to smaller core diameters for the same given fiber OD, in contrast to conventional preforms where this ratio is fixed once the blank is fabricated. The ratio of the outer diameter (OD) to the inner diameter (ID) of the tube will be roughly the same as the fiber OD/ID although, as stated, it can be controlled by the pressure (positive or negative) applied over the molten core relative to outside the cladding tube.

Controlled glass composition and thermal history can be used to generate graded index profiles. When the core is molten and the cladding is softening, diffusional processes are relatively fast, thus graded index profiles can be created in situ.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:
1. A method for making a continuous-clad filament including a core and a cladding adjacent said core region, comprising the steps of:
   a) providing a core cullet feedstock having a particle diameter between about 100–5,000 μm and a known melting point;
   b) providing a rigid cladding structure having a softening point higher than the melting point of said core feedstock, wherein said cladding has a composition that is chemically compatible with said core;
   c) introducing said cullet into said cladding structure;
   d) heating an end of said core containing cladding structure in a furnace to near the softening point of said cladding; and
   e) drawing said core containing cladding into a continuous clad filament;

wherein the core cullet is a glass having a composition consisting essentially, in mole %, of:

| | |
|---|---|
| SiO$_2$ | 0–90 |
| GeO$_2$ | 0–90 |
| Na$_2$O | 0–25 |
| Li$_2$O | 0–10 |
| K$_2$O | 0–25 |
| Rb$_2$O | 0–25 |
| Cs$_2$O | 0–25 |
| Al$_2$O$_3$ | 5–40 |
| Ga$_2$O$_3$ | 5–40 |
| RE$_2$(1)O$_3$ | 0–40 |
| RE$_2$(2)O$_3$ | 0–1 |
| Er$_2$O$_3$ | 0.001–5 |
| Yb$_2$O$_3$ | 0–5 |
| PbO | 0–15 |
| RO | 0–20 |
| ZnO | 0–10 |
| ZrO$_2$ | 0–2 |
| TiO$_2$ | 0–2 |
| Nb$_2$O$_5$ | 0–10 |
| Ta$_2$O$_5$ | 0–10 |
| P$_2$O$_5$ | 0–5 |
| B$_2$O$_3$ | 0–15 |
| As$_2$O$_3$ | 0–10 |
| Sb$_2$O$_3$ | 0–20 |
| Na$_2$Cl$_2$ | 0–10 |
| Bi$_2$O$_3$ | 0–5, and | up to 15 weight % fluorine in the form of at least one of a fluorinated component of the glass composition and a batch constituent selected from a group consisting of at least one of AlF$_3$, REF$_3$, NH$_5$F$_2$, NaF, Na$_2$SiF$_6$, Na$_3$AlF$_6$, where RE(1) is at least one of Y, La, Gd, and Lu;

RE(2) is at least one of Ce, Pr, Nd, Sm, Eu, Tb, Dy, Ho, and Tm;

R is at least one of Ba, Ca, Mg, and Sr;

(SiO$_2$+GeO$_2$) is in the range (40–90); and (Al$_2$O$_3$+Ga$_2$O$_3$)>(RO+"alk"$_2$O+RE$_2$O$_3$) where "alk" is at least one of Li, Na, K, Cs, and Rb.

2. The method of claim 1 in which the cladding has a composition consisting essentially, in mole %, of:

| | |
|---|---|
| SiO$_2$ | 90–100 |
| B$_2$O$_3$ | 0–10 |
| P$_2$O$_5$ | 0–10 |
| Al$_2$O$_3$ | 0–10 |
| GeO$_2$ | 0–10 |
| SiF$_4$ | 0–10. |

3. The method of claim 1 in which the cladding structure is a tube that is not sealed at any part thereof that is not the drawing end.

4. A method for making a continuous-clad filament including a core and a cladding adjacent said core region, comprising the steps of:

a) providing a core cullet feedstock having a particle diameter between about 100–5,000 μm and a known melting point;

b) providing a rigid cladding structure having a softening point higher than the melting point of said core feedstock, wherein said cladding has a composition that is chemically compatible with said core;

c) introducing said cullet into said cladding structure;

d) heating an end of said core containing cladding structure in a furnace to near the softening point of said cladding; and e) drawing said core containing cladding into a continuous clad filament;

wherein the core cullet is a glass having a composition consisting essentially, in mole %, of:

| | |
|---|---|
| SiO$_2$ | 0–90 |
| GeO$_2$ | 0–90 |
| Na$_2$O | 0–25 |
| Li$_2$O | 0–10 |
| K$_2$O | 0–25 |
| Rb$_2$O | 0–25 |
| Cs$_2$O | 0–25 |
| Al$_2$O$_3$ | 0–40 |
| Ga$_2$O$_3$ | 0–40 |
| RE$_2$(1)O$_3$ | 0–40 |
| RE$_2$(2)O$_3$ | 0–1 |
| Er$_2$O$_3$ | 0.001–5 |
| Yb$_2$O$_3$ | 0–5 |
| PbO | 0–15 |
| RO | 0–20 |
| ZnO | 0–10 |
| ZrO$_2$ | 0–2 |
| TiO$_2$ | 0–2 |
| Nb$_2$O$_5$ | 0–10 |
| Ta$_2$O$_5$ | 0–10 |
| P$_2$O$_5$ | 0–5 |
| B$_2$O$_3$ | 0–15 |
| As$_2$O$_3$ | 0–10 |
| Sb$_2$P$_3$ | 0–20 |
| Na$_2$CL$_2$ | 0–10 |
| Bi$_2$O$_3$ | 0–5, and | up to 15 weight % fluorine in the form of at least one of a fluorinated component of the glass composition and a batch constituent selected from a group consisting of at least one of AlF$_3$, REF$_3$, NH$_5$F$_2$, NaF, Na$_2$SiF$_6$, Na$_3$AlF$_6$, where RE(1) is at least one of Y, La, Gd, and Lu;

RE(2) is at least one of Ce, Pr, Nd, Sm, Eu, Tb, Dy, Ho, and Tm;

R is at least one of Ba, Ca, Mg, and Sr;

(SiO$_2$+GeO$_2$) is in the range (40–90); and (Al$_2$O$_3$+Ga$_2$O$_3$)>(RO+"alk"$_2$O+RE$_2$O$_3$) where "alk" is at least one of Li, Na, K, Cs, and Rb.

5. The method according to claim 4 wherein the Al$_2$O$_3$ is 5–40 mole %.

6. The method according to claim 4 wherein the Ga$_2$O$_3$ is 5–40 mole %.

* * * * *

UNITED STATES PATENT AND TRADEMARK OFFICE
CERTIFICATE OF CORRECTION

PATENT NO.    : 6,374,641 B1
DATED         : April 23, 2002
INVENTOR(S)   : Chu Polly W. et al.

It is certified that error appears in the above-identified patent and that said Letters Patent is hereby corrected as shown below:

<u>Title page,</u>
Item [56], OTHER PUBLICATIONS, "Bayart et al., "1.55 βm fluoride-based EDFA with gain-flat-" should be -- Bayart et al., "1.55 μm fluoride-based EDFA with gain-flat- --

<u>Column 9,</u>
Line 41, "RE(2) is at least one of Ce, Pr, Nd, Sm, Eu, Th, Dy, Ho," should be -- RE(2) is at least one of Ce, Pr, Nd, Sm, Eu, Tb, Dy, Ho, --

<u>Column 10,</u>
Line 39, "$Sb_2P_3$" should be -- $Sb_2O_3$ --
Line 40, "$Na_2CL_2$" should be -- $Na_2Cl_2$ --

Signed and Sealed this

Nineteenth Day of August, 2003

JAMES E. ROGAN
*Director of the United States Patent and Trademark Office*